United States Patent [19]

Ozawa et al.

[11] Patent Number: 4,544,977
[45] Date of Patent: Oct. 1, 1985

[54] MAGNETIC DISC DEVICE

[75] Inventors: Kazuo Ozawa; Tetsuo Sawa, both of Tagajo, Japan

[73] Assignee: Sony Corporation, Japan

[21] Appl. No.: 413,228

[22] Filed: Aug. 30, 1982

[30] Foreign Application Priority Data

Aug. 31, 1981 [JP] Japan .................................. 56-129064

[51] Int. Cl.⁴ ...................... G11B 23/02; G11B 5/016; B65D 85/30
[52] U.S. Cl. ...................................... 360/133; 360/99; 360/137; 206/444
[58] Field of Search ...................... 360/133, 99, 130.1, 360/97, 98, 135, 86, 130; 206/444; 346/137; 428/64, 900

[56] References Cited

U.S. PATENT DOCUMENTS

| 4,175,274 | 11/1979 | Mann | 360/99 |
| 4,414,597 | 11/1983 | Cornin | 360/133 |
| 4,419,164 | 12/1983 | Martinelli | 428/900 |
| 4,428,013 | 1/1984 | Posso | 206/444 |
| 4,445,157 | 4/1984 | Takahashi | 360/133 |
| 4,458,282 | 7/1984 | Mui | 360/133 |
| 4,459,628 | 7/1984 | Barton | 360/137 |

Primary Examiner—Robert M. Kilgore
Attorney, Agent, or Firm—Hill, Van Santen, Steadman & Simpson

[57] ABSTRACT

A flexible magnetic disc cassette contains a flexible magnetic disc which is driven by a shaft associated with a driving device. The disc is contained within a cover having an upper half and lower half. An anti-wearing member is attached on an inner surface of the upper half of the cover for abutment with the driving device shaft so as to correct warpage of the upper half of the cover.

5 Claims, 9 Drawing Figures

MAGNETIC DISC DEVICE

RELATED APPLICATIONS

This application is related to U.S. application Ser. No. 292,447 of Takahashi filed Aug. 31, 1981, now U.S. Pat. No. 4,445,157.

BACKGROUND OF THE INVENTION

The present invention relates to a magnetic disc device wherein a magnetic disc is housed in a casing.

A magnetic disc device as illustrated in U.S. Ser. No. 292,447 will first be described with reference to FIGS. 1 and 2A and 2B, in which FIG. 1 is an exploded perspective view of the device and FIGS. 2A and 2B are respectively a top view and a bottom view of the same. Referring to these figures, a flexible magnetic disc 1 consists of a thin, disc-shaped base film of a high polymeric material and a magnetic layer uniformly formed on the bottom surface of the base film. A center core 2 is fitted in a circular hole at the center of the magnetic disc 1 through a ring-shaped double-coated adhesive tape 3. The center core 2 has a flange 4 and is formed by pressing a thin metal plate. The magnetic disc 1 is adhered to the flange 4. A motor shaft insertion hole 5 of a substantially square shape is formed at the center of the center core 2. A position regulating pin insertion hole 6 of a rectangular shape is formed in the center core 2 at a predetermined distance from the motor shaft insertion hole 5.

The magnetic disc 1 with the center core 2 is housed within a casing consisting of an upper shell 7 and a lower shell 8. These shells 7 and 8 are injection-molded from an ABS resin containing an antistatic agent, and are adhered together at the peripheries by ultrasonic sealing. The center core 2 is fitted with a small clearance into a circular opening 9 formed at the center of the lower shell 8. Four arc-shaped ribs 10 extend on the inner surface of the lower shell 8 concentrically with the opening 9, and corresponding arc-shaped ribs are also formed on the inner surface of the upper shell 7.

Liners 11 and 12 of unwoven fabric such as rayon are adhered to the inner surfaces of the upper and lower shells 7 and 8 by heat sealing or ultrasonic sealing. The liners 11 and 12 serve to automatically remove dust deposited on the magnetic disc 1 and prevent dropout of the disc during rotation, as well as to prevent abrasion and generation of static electricity of the magnetic disc 1. The liner 12 is adhered on the inner surface of the lower shell 8 through a tongue 13 of a synthetic resin, so that the liner 12 is securely urged against the magnetic surface of the magnetic disc 1.

Elongate holes 14, 15, 16 and 17 of identical shape are formed in the upper shell 7, the lower shell 8, the liner 11 and the liner 12 respectively to extend in the radial direction of the magnetic disc 1. When the upper and lower shells 7 and 8 are joined together, these elongated holes are registered with each other. Upon loading the magnetic disc into a magnetic disc recorder, a magnetic head is brought into contact with the magnetic disc 1 through the elongated hole 17 formed in the lower shell 8 and the elongated hole 16 formed in the liner 12. Similarly, a head pad is inserted into the elongated hole 14 formed in the upper shell 7 and into the elongated hole 15 formed in the liner 11.

Recesses 18 and 19 are formed on those parts of the upper and lower shells 7 and 8 which include the elongated holes 14 and 17, respectively. A U-shaped aluminum shutter 20 which has slits 21 and 22 of the same shape as that of the elongated holes 14 to 17 is slidably mounted such that it clips into the recesses 18 and 19.

As shown in FIG. 2B, a guide groove 23 is formed along the side edge of the lower shell 8. Three protuberances 24 project inwardly from the shutter 20 in correspondence with the guide groove 23. Therefore, the shutter 20 is guided along the guide groove 23 to establish the operating state and the non-operating state. Referring to FIGS. 2A and 2B, in the operating state the elongated holes 16 and 17 for head insertion, the elongated holes 14 and 15 for head pad insertion, and the slits 21 and 22 are all registered as indicated by the solid lines, and the magnetic disc 1 is exposed therethrough. On the other hand, in the non-operating state, the elongated holes 14 to 17 are closed and the magnetic disc 1 is covered by the shutter 20, as indicated by the dotted line. In this manner, the shutter 20 serves to protect the magnetic disc 1 and prevent introduction of dust.

An erroneous erasure prevention lug 25 is arranged at one corner of the lower shell 8. Information recorded on the magnetic disc 1 is protected if the lug 25 is removed. As shown in FIG. 2B, a pair of positioning holes 26 and 27 for positioning the magnetic disc device in a disc recorder are formed at two corners of the lower shell 8. At the other two corners of the lower shell 8 at which the positioning holes 26 and 27 are not formed, positions 28 and 29 indicated by hatched lines in FIG. 2B serve as reference surfaces. Thus, the magnetic device is supported at the reference position with reference to the four corners.

In the disc recorder shown in FIG. 3, four receiving pins 31 for receiving a magnetic disc device 30 as described above extend upright on a chassis 32. The top ends of two of the pins 31 are inserted in the positioning holes 26 and 27 of the lower shell 8, and the top ends of the remaining two pins 31 abut against the reference surfaces 28 and 29. The magnetic disc device is supported in a horizontal plane at a predetermined height by the pins 31, and recording or reproduction of digital or analog signals is performed in this state. A pivot plate 35 pivots about shafts 33 and 34. The magnetic disc device 30 is pressed from above by four pins 36 extending downward from the pivot plate 35. These press pins 36 are constantly biased downward by coil springs 37.

SUMMARY OF THE INVENTION

As shown in FIG. 4, a brushless motor 38 of a flat shape for driving the magnetic disc 1 within the magnetic disc device 30 is mounted on the chassis 32. This brushless motor 38 has a motor shaft 39 and a position regulating pin 40 which respectively engage with the holes 5 and 6 formed in the center core 2. The top of the motor shaft 39 is formed into a hemispherical shape and extends through the hole 5 in the center core 2 to be in contact with the inner surface of the upper shell 7. With this arrangement, if the upper shell 7 of the magnetic disc device 30 is warped downward as shown in FIG. 5A, the central part of the upper shell 7 may be held up by the top end of the motor shaft 39 as shown in FIG. 5B. Then the magnetic disc 1 may be rotated with a motor of a low torque.

When a magnetic disc device of the configuration as described above is used for a long period of time, abrasion of the resin of the upper shell 7 results at the part where it is in contact with the top end of the motor shaft

39. The powder formed by the abrasion is scattered and is deposited on the magnetic disc 1. This causes dropouts of record signal or interferes with correction of inward warpage of the shell as well as an increase in the load torque of the magnetic disc 1. According to the invention, in the magnetic disc device, a member of excellent abrasion resistance is arranged on the portion of the inner surface of an upper shell which is brought into contract with the motor shaft.

DETAILED DESCRIPTION OF THE PREFERRED EMBODIMENTS

Figure 1:
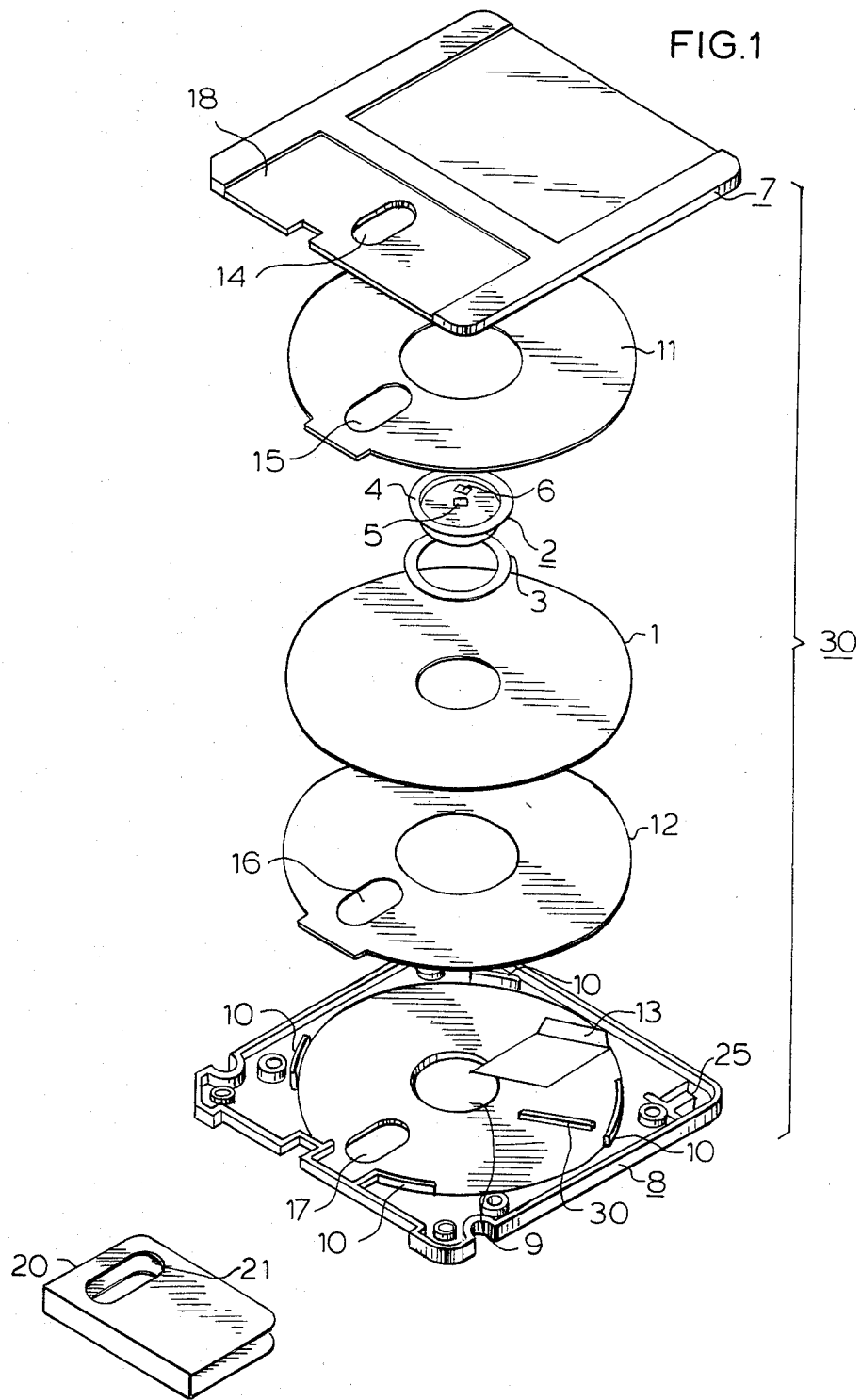
FIGS. 1 and 2A and 2B are an exploded perspective view, a top view, and a bottom view of a magnetic disc device in which the invention is employed.
Figure 2A:
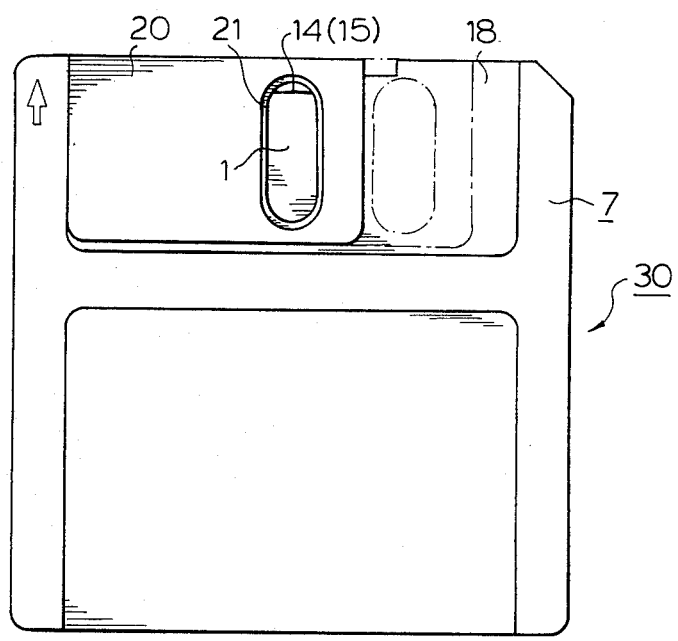
Figure 2B:
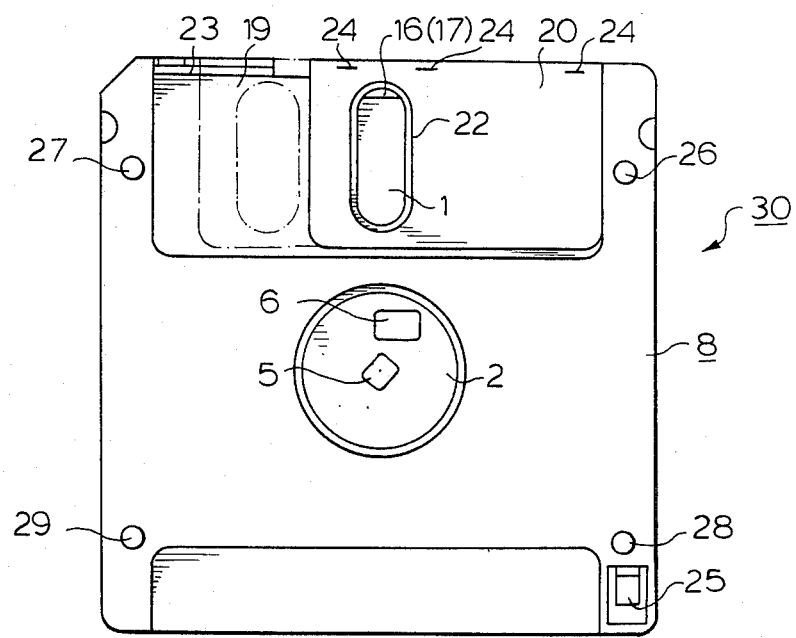
Figure 3:
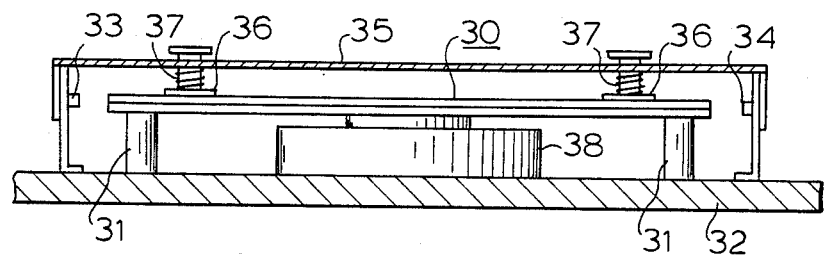
FIGS. 3 and 4 are a side view and a sectional view showing the state in which the magnetic disc device shown in FIGS. 1, 2A and 2B is loaded onto a disc recorder.
Figure 4:
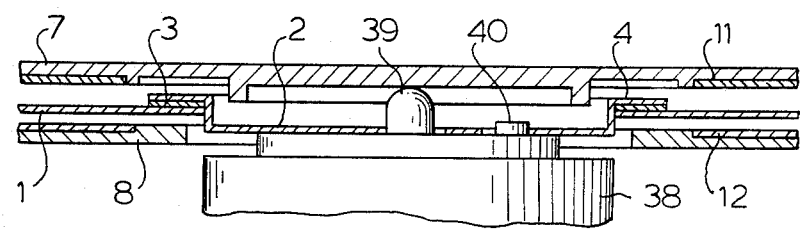
Figure 5A:
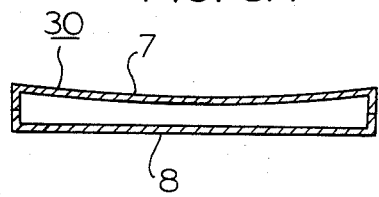
FIGS. 5A and 5B are schematic views for explaining the correction of warpage of the magnetic disc deivce.
Figure 5B:
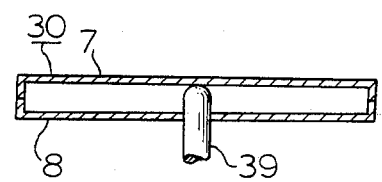
Figure 6:
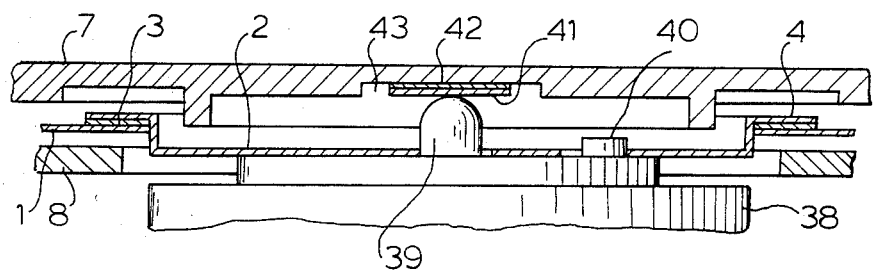
FIGS. 6 and 7 are sectional views of a magnetic disc device according to the present invention.

A preferred embodiment of the present invention will now be described with reference to FIG. 6. Referring to FIG. 6, a portion of a cassette case is shown wherein upper shell 7 which is warped, is positioned in a planar or straight configuration through abutment with shaft 39. Reference numeral 41 denotes a circular abrasion-resistant sheet made of a synthetic resin with excellent abrasion resistance (e.g., a high pressure process polyethylene film, an ultra-high polymeric polyethylene film, or the like). The sheet 41 is adhered through an adhesive 42 to that part of the upper shell 7 which is brought into contact with the motor shaft 39. A recess 43 of a depth corresponding to the total thickness of the sheet 41 and the adhesive 42 is formed at the appropriate position of the inner surface of the upper shell 7. When shaft 39 abuts against sheet 41, warpage of sheet 7 is corrected.

Figure 7:
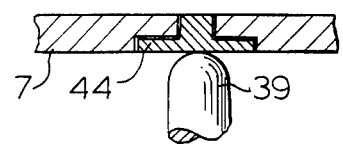

FIG. 7 shows a modification of the present invention. According to this modification, an engaging recess is formed at that part of the inner surface of the upper shell 7 which is brought into contact with the motor shaft 39. A receiving material 44 for prevention of abrasion, and which is made of a polyacetal resin or the like, is fitted inside this recess.

According to the present invention, a member with excellent abrasion resistance is arranged at that part of the inner surface of the upper shell 7 which is brought into contact with the top end of the motor shaft 39. Therefore, a dropout of the magnetic disc may be prevented, and the load torque of the magnetic disc due to inward warpage of the shell is reduced.

Although various minor modifications may be suggested by those versed in the art, it should be understood that we wish to embody within the scope of the patent granted hereon, all such modifications as reasonably and properly come within the scope of our contribution to the art.

We claim as our invention:

1. A magnetic disc cassette formed of a flexible magnetic disc received on a driving mechanism having a shaft associated therewith, comprising:

a cover having upper and lower walls closely spaced to a flexible magnetic disc contained within the cover;

a center core attached at a center of said flexible magnetic disc, said center core having a central aperture with a corresponding aperture in the lower wall of said disc cassette positioned for access to said magnetic disc center core;

said shaft being positioned through the aperture of said lower wall of the cassette and through the central aperture of said center core, and an end of said shaft abutting against an inner surface of the upper wall of the cassette when the cassette is in an operating position on the driving mechanism; and an anti-wearing member attached at a portion of the inner surface thereof where said end of said shaft is brought in contact therewith.

2. The disc cassette according to claim 1 wherein said anti-wearing member is a sheet made of resin secured at the inner surface of the upper half of the cover by adhesive.

3. The flexible magnetic disc cassette according to claim 2 wherein said anti-wearing member is a piece of resin.

4. A magnetic disc cassette according to claim 1 wherein the inner surface of the upper wall where said shaft is brought in contact therewith has a recess in which is received a resin material as said anti-wearing member.

5. A disc cassette according to claim 4 wherein the recess has a depth chosen such that the resin attached by an adhesive in the recess lies flush with the inner surface of the upper wall.

* * * * *